Dec. 29, 1964  P. H. LUPOLI  3,163,192
FOOD SLICING MACHINE
Filed Sept. 14, 1962  2 Sheets-Sheet 2
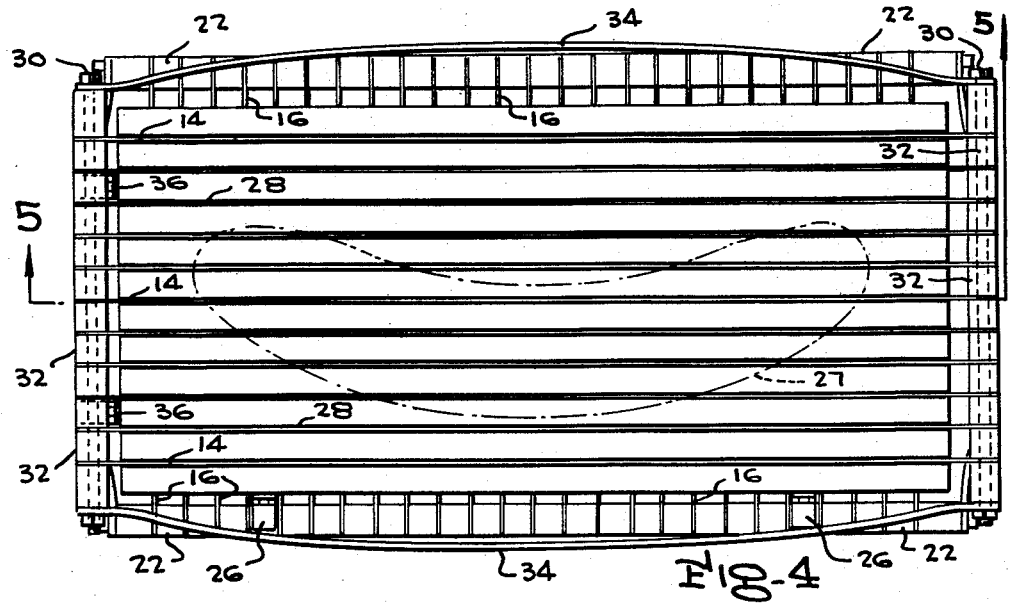
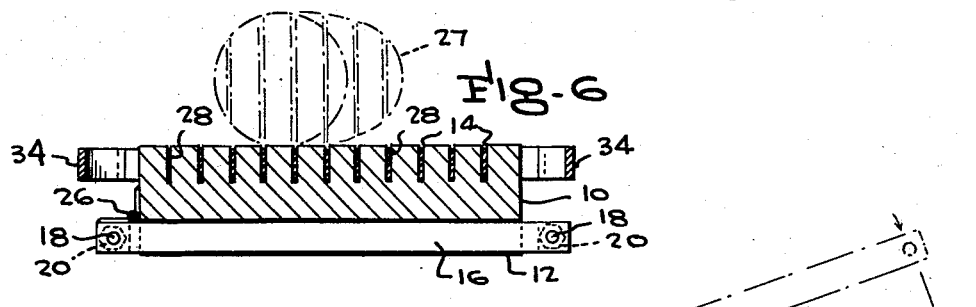
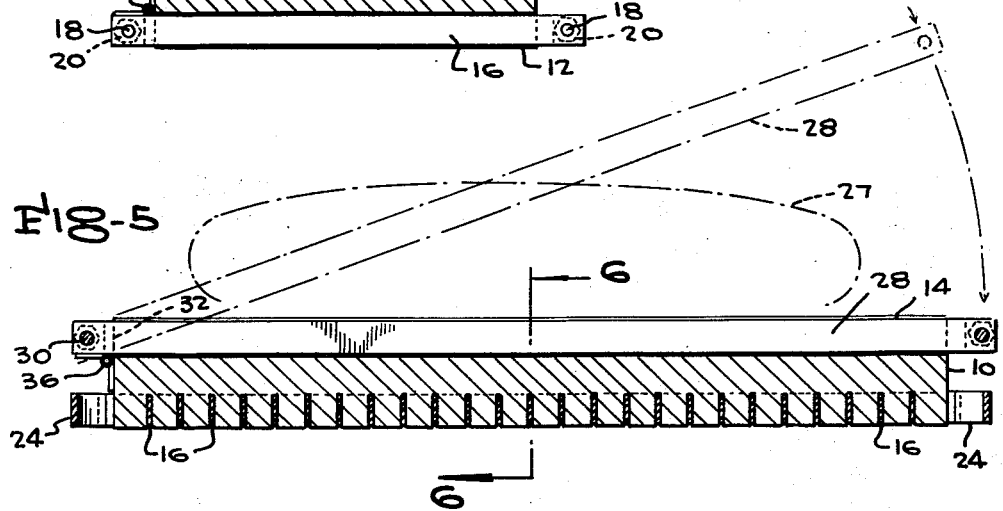
INVENTOR.
PAUL H. LUPOLI

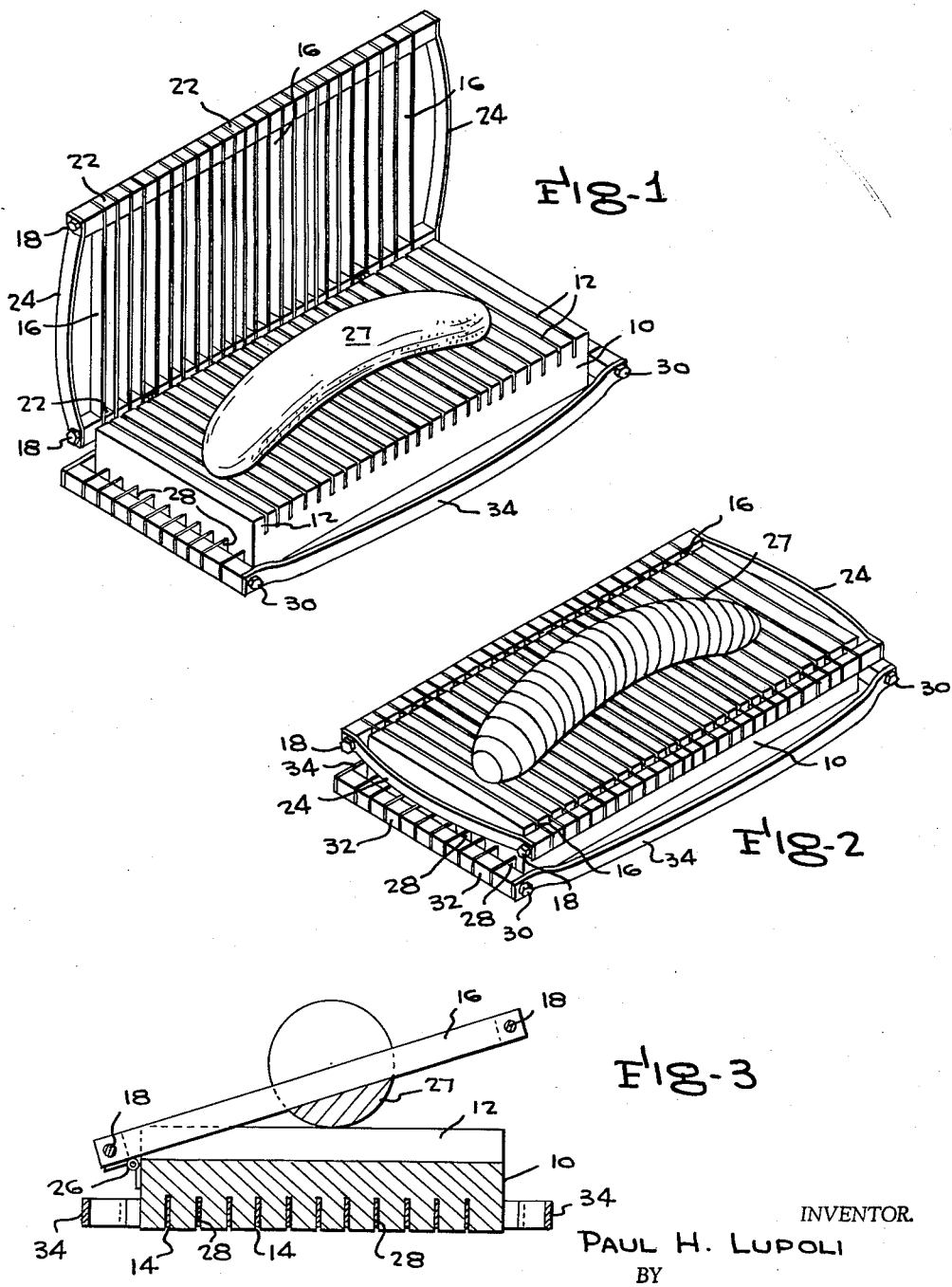

3,163,192
FOOD SLICING MACHINE
Paul H. Lupoli, 78—27 90th Ave., Woodhaven 21, N.Y.
Filed Sept. 14, 1962, Ser. No. 223,661
8 Claims. (Cl. 146—5)

This invention relates to a food slicing machine, and in particular to a machine having a special utility in the slicing of elongate items, such as bananas. Although labor-saving devices have been proposed in the matter of slicing, in the cases of a great variety of foods, the problem of slicing bananas seems to have escaped attention, and this chore, in respect to slicing bananas in the preparation of banana splits for instance, and in embellishing cereals, salads, and other dishes, whether in the home, or commercially, is still performed largely by means of a paring knife and hand manipulation.

It is therefore a general object of the invention to facilitate the slicing of fruits and other foodstuffs.

More particularly, it is an object to provide a slicing device which performs a complete, plural, slicing operation, with a single stroke.

It is also to be noted that in the variegated use of bananas, in subdivided form, the slicing may be effected either longitudinally of the fruit, or transversely thereof, depending on the environmental use, and the particular end sought, and it is therefore a further object of the invention to provide a unitary slicing unit which is capable of performing either of these types of slices, alternatively.

The objects also include the provision of a device which is compact, and simple in structure, yet rugged, durable, and efficient in operation, and which, additionally, is easy of manufacture, and low in cost.

These, and other ends, which will be apparent, are attained by the present invention, a preferred form of which may be briefly described as comprising a rectangular, elongate block, with parallel, equi-spaced grooves in opposite faces, the two sets of grooves being mutually perpendicular, and cutter units swingably mounted on edges of the block, with gang knives arranged for reception in the grooves.

For a more detailed description of the invention, reference is made to the following specification, as illustrated in the drawings, in which:

FIGURE 1 is a perspective view of the slicer, with a banana in place, in preparation for cutting transverse slices;

FIGURE 2 is a view similar to FIGURE 1, showing completion of the slicing operation;

FIGURE 3 is a transverse sectional view through the cutter, showing a stage of slicing intermediate between those shown in FIGURES 1 and 2;

FIGURE 4 is a plan view of the slicer, with the bottom side of FIGURES 1 and 2 turned to face upward, in position for longitudinal slicing, and showing a banana, in dash lines, in position for longitudinal slicing;

FIGURE 5 is a sectional view, taken on the plane of the line 5—5 of FIGURE 4, showing, in dash lines, an intermediate position of swing of the knives and FIGURE 6 is a sectional view, taken on the plane of the line 6—6 of FIGURE 5.

Referring to the drawings by characters of reference, there is shown an elongate, rectangular block 10, having, in one face, a set of equi-spaced, parallel, rectangular grooves, or channels, 12, parallel to the short, end edges of the block, and in the opposite face, a similar set of grooves 14, arranged parallel to the longer, side edges of the block, the two sets of grooves in the opposite faces being, therefore, mutually perpendicular, As seen in FIGURES 3, 5 and 6, the grooves extend in depth for about one-third of the thickness of the block, which leaves a substantial, solid portion medially of the block thickness, for rigidity, and firm backing for the slicing knives.

Each grooved face of the block is provided with a swingable, gang slicer, comprising a plurality of knives, assembled on a frame, and hinged to the block. Thus, as seen in FIGURES 1–3, the slicer cooperating with short, transverse grooves 12, comprises a series of knives 16, each having a pair of bores near its two ends, by which it is received on a pair of long bolts 18, provided with nuts 20. Suitably bored, spacer blocks 22 are mounted on bolts 18, one between each adjacent pair of knives, to properly position the knives for entry into grooves 12. Since the knives are relatively thin, the slicer assembly is given rigidity by a pair of bowed leaf springs 24 under flexure, having bores by which they are received on the two bolts 18, at each end of the assembly. Since bananas are easily penetrated in slicing, the knives need not have sharp edges, and therefore may be easily provided as sections cut from a ribbon of thin stock, of rectangular cross section.

The knife assembly thus described, is mounted on the block for swinging movement by any suitable hinge means. As shown, these comprise two hinges 26, but more may be employed, or a piano-type hinge may be used. A trunnion-type of mounting is also possible. Each hinge is secured to one of the spacers 22 and to an edge of the block 10.

The operation of transverse slicing will be clear from FIGURES 1 to 3. With a peeled banana 27 laid lengthwise, in the longitudinal direction of the block, it is only necessary to swing the gang slicer downward, with the individual knives passing through the banana, dividing it into a plurality of discs, as shown in FIGURE 2, and passing downward into the grooves 12.

Except for length and number, the gang knives for longitudinal slicing are arranged in an assembly of construction similar to that providing the transverse cuts. Thus, knives 28 are received on bolts 30 as separated by spacers 32, with bowed leaf springs 34, under flexure, providing rigidity, and the assembly swing-mounted on hinges 36. With a banana laid on this side of the block, as seen in FIGURE 4, descent of the slicing unit will result in longitudinal slices, the shape of which will be evident from the position of the knives 28, shown in FIGURE 4, and the segments of sliced banana, shown by the broken, vertical lines in FIGURE 6.

Other decorative effects may be obtained by placing the banana oblique to the main dimensions of the block, on either side, for cutting, which will provide cut segments of a character intermediate the discs and the long slices.

Thus, there has been provided a highly compact and versatile device, having two distinct types of slicers, which are completely stowed away in their mounting block, when not in use, and which are available, alternatively, for use, by the simple expedient of turning the block over.

While a certain, preferred embodiment has been shown and described, modifications will be apparent, in the light of this disclosure, and the invention should not, therefore, be deemed as limited, except insofar as shall appear from the spirit and scope of the appended claims.

What is claimed is:

1. A reversible slicer, for foodstuffs or the like, comprising an elongate, rectangular block, with opposite, parallel faces, each having throughout, a series of equi-spaced, parallel, channel grooves of constant depth, extending for approximately one-third of the thickness of the block, the grooves in one face being parallel to the short dimension thereof, and the grooves in the other face being parallel to the long dimension thereof, and a pair of knife units, each hingedly connected to an edge of said block, and each having a series of equi-spaced, parallel knife blades of rectangular construction positioned and arranged to be received in the grooves in one of the respective, said faces, each knife unit comprising a pair of bolts, and said blades having bores at opposite ends, received on said bolts, spacer means having bores received on said bolts, and located between adjacent blades, and bowed, leaf springs, having end bores received on said blades, and in a state of flexure, at the two ends of said series of knives.

2. A reversible slicer, for foodstuffs or the like, comprising an elongate, rectangular block, with opposite, parallel faces, each having throughout, a series of equi-spaced, parallel, channel grooves of constant depth, terminating short of the middle of the block, the grooves in one face being parallel to the short dimension thereof and the grooves in the other face being parallel to the long dimension thereof, and a pair of knife units, each hingedly connected to an edge of said block, and each having a series of equi-spaced, parallel knife blades of rectangular construction, positioned and arranged to be received in the grooves in one of the respective, said faces, each knife unit comprising a pair of bolts, and said blades having bores at opposite ends, received on said bolts, spacer means having bores received on said bolts, and located between adjacent blades, and bowed, leaf springs, having end bores received on said blades, and in a state of flexure, at the two ends of said series of knives.

3. A reversible slicer, for foodstuffs or the like, comprising an elongate, rectangular block, with opposite, parallel faces, each having throughout, a series of equi-spaced, parallel, channel grooves of constant depth, the grooves in one face being parallel to the short dimension thereof, and the grooves in the other face being parallel to the long dimension thereof, and a pair of knife units, each hingedly connected to an edge of said block, and each having a series of equi-spaced, parallel knife blades of rectangular construction positioned and arranged to be received in the grooves in one of the respective, said faces, each knife unit comprising a pair of bolts, and said blades having bores at oppoiste ends, received on said bolts, spacer means having bores received on said bolts, and located between adjacent blades, and bowed, leaf springs, having end bores received on said blades, and in a state of flexure, at the two ends of said series of knives.

4. A reversible slicer, for foodstuffs or the like, comprising an elongate, rectangular block, with opposite, parallel faces, each having a series of parallel, channel grooves of constant depth, the grooves in one face being parallel to the short dimension thereof, and the grooves in the other face being parallel to the long dimension thereof, and a pair of knife units, each hingedly connected to an edge of said block, and each having a series of equi-spaced, parallel knife blades of rectangular construction positioned and arranged to be received in the grooves in one of the respective, said faces, each knife unit comprising a pair of bolts, and said blades having bores at opposite ends, received on said bolts, spacer means having bores received on said bolts, and located between adjacent blades, and bowed, leaf springs, having end bores received on said blades, and in a state of flexure, at the two ends of said series of knives.

5. A reversible slicer, for foodstuffs or the like, comprising an elongate, rectangular block, with opposite, parallel faces, each having a series of parallel, channel grooves, the grooves in one face being parallel to the short dimension thereof, and the grooves in the other face being parallel to the long dimension thereof, and a pair of knife units, each hingedly connected to an edge of said block, and each having a series of equi-spaced, parallel knife blades of rectangular construction, positioned and arranged to be received in the grooves in one of the respective, said faces, each knife unit comprising a pair of integrating rods, and said knives having bores at opposite ends, received on said rods, spaced means having bores received on said rods, and located between adjacent knives, and bowed, leaf springs, having end bores received on said rods, an in a state of flexure, at the two ends of said series of knives.

6. A reversible slicer, for foodstuffs or the like, comprising an elongate, rectangular block, with opposite, parallel faces, each having a series of parallel, channel grooves, the grooves in one face being parallel to the short dimension thereof, and the grooves in the other face being parallel to the long dimension thereof, and a pair of knife units, each hingedly connected to an edge of said block, and each having a series of equi-spaced, parallel knife blades of rectangular construction, positioned and arranged to be received in the grooves in one of the respective, said faces, each knife unit comprising a connector means for the ends of said knife blades, and bowed, leaf springs, having end bores received on said connector means, and in a state of flexure, at the two ends of said series of blades.

7. A reversible slicer, for foodstuffs or the like, comprising an elongate, rectangular block, with opposite, parallel faces, each having a series of parallel, channel grooves, the grooves in one face being parallel to the short dimension thereof, and the grooves in the other face being parallel to the long dimension thereof, and a pair of knife units, each hingedly connected to an edge of said block, and each having a series of equi-spaced, parallel knife blades of rectangular construction, positioned and arranged to be received in the grooves in one of the respective, said faces, each knife unit comprising a connector means for the ends of said knife blades, and including spring means arranged to apply tension to said blades in a plane transverse thereto.

8. A reversible slicer, for foodstuffs or the like, comprising an elongate, rectangular block, with opposite, parallel faces, each having a series of parallel, channel grooves, the grooves in one face being parallel to the short dimension thereof, and the grooves in the other face being parallel to the long dimension thereof, and a pair of knife units, each hingedly connected to an edge of said block, and each having a series of equi-spaced, parallel knife blades, positioned and arranged to be received in the grooves in one of the respective, said faces, each knife unit comprising a connector means for the ends of said knife blades, and including spring means arranged to apply tension to said blades in a plane transverse thereto.

References Cited by the Examiner
UNITED STATES PATENTS

| | | | |
|---|---|---|---|
| 1,531,314 | 3/25 | Simberg et al. | 146—203 |
| 2,073,257 | 3/37 | Van Riper | 146—78 |

J. SPENCER OVERHOLSER, *Primary Examiner.*